UNITED STATES PATENT OFFICE.

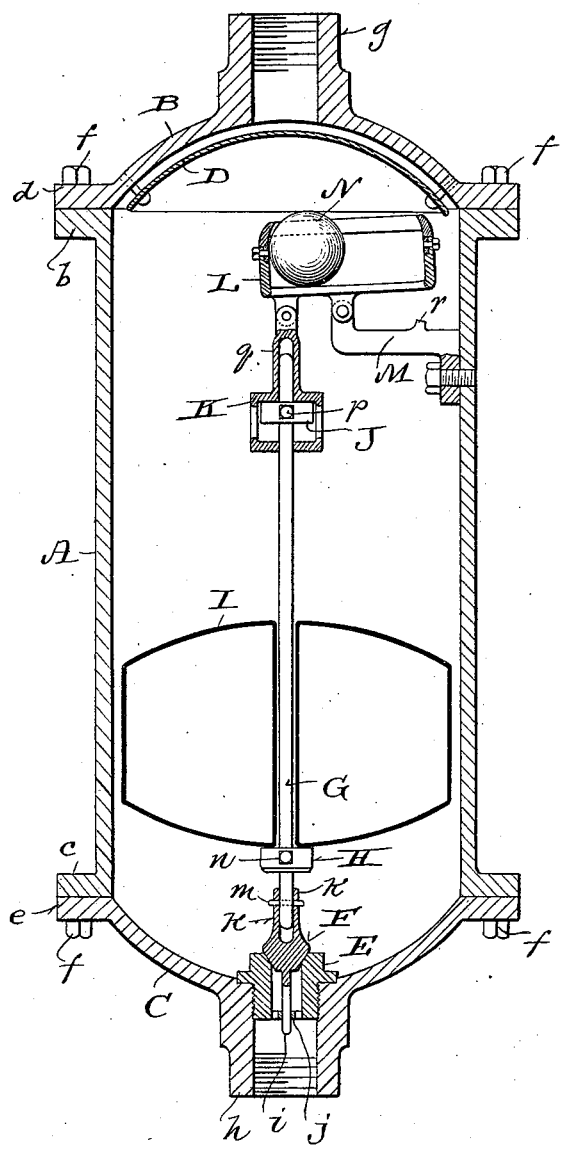

CHARLES H. HARTTERT, OF MILWAUKEE, WISCONSIN.

STEAM-TRAP.

SPECIFICATION forming part of Letters Patent No. 565,457, dated August 11, 1896.

Application filed May 12, 1896. Serial No. 591,247. (No model.)

*To all whom it may concern:*

Be it known that I, CHARLES H. HARTTERT, a citizen of the United States, and a resident of Milwaukee, in the county of Milwaukee and State of Wisconsin, have invented certain new and useful Improvements in Steam-Traps; and I do hereby declare that the following is a full, clear, and exact description thereof.

My invention has for its object to provide a simple economical automatic steam-trap that is not liable to get out of order and which will be positive in its operation, the same consisting in certain peculiarities of construction and combination of parts hereinafter set forth with reference to the accompanying drawing and subsequently claimed.

The drawing represents a vertical section of a steam-trap constructed according to my invention; and referring by letter to said drawing, A represents a preferably cylindrical shell having out-turned end flanges $b$ $c$, to which similar flanges $d$ $e$ of a preferably dome-shaped top B and cup-shaped bottom C are rigidly secured by screws $f$ or other suitable means, the joints being steam-tight.

The top B is provided with an inlet-nipple $g$ for connection with a steam-pipe, and the bottom C has an outlet-nipple $h$ for connection with a waste-pipe for water of condensation caught in the trap.

As herein shown, it is preferable to have a deflector-plate D in suspension from the top B of the trap, and by means of this deflector the steam entering said trap through nipple $g$ is diverted toward the shell A, along which it condenses; consequently pressure central of the trap below the deflector is modified, if not entirely obviated. Screw-threaded or otherwise suitably secured in the bottom C of the trap is a seat E for a lift-valve F, having a depending pin $i$, that plays freely in a central aperture of a spider $j$, constituting part of said seat, to guide the valve on and off the same, and upwardly-extending arms $k$ of the valve are united to a stem G by a transverse pivot-pin $m$, and this pivotal connection facilitates accurate seating of said valve.

A collar H, adjustable vertically of the valve-stem G, is held in adjusted position by means of a set-screw $n$, and supported on this collar is a float I, that loosely engages said stem. The float may be of any suitable material or construction, the one herein shown being a hollow sheet-metal shell having a central aperture for engagement of the valve-stem.

Another collar J, also vertically adjustable on the valve-stem G, is held in adjusted position by means of a set-screw $p$, and the latter collar is arranged to come within a shackle K, having a bottom aperture and a socket-shank $q$ engaged by said valve-stem, the collar-engaging portion of the shackle being of such dimensions that it will have a predetermined play before exerting power on the collar J, the latter being positioned through lateral apertures in said shackle.

The shank $q$ of shackle K is pivotally connected to the bottom of a cage L, the latter being likewise connected to a horizontal arm M of a bracket made fast to the shell or body of the trap. The pivotal connection of the arm M and cage L is preferably eccentric of the latter, the preponderance of said cage being on the arm side of its center, and said arm is shown provided with a stop-lug $r$, that limits tilt of the aforesaid cage in a direction necessary to cause lift of the valve.

Loose in the cage L is a ball N, of any suitable weight, a detachable upper section of said cage being of such construction as will prevent automatic displacement of the ball without interference with its free play.

The valve being seated, water of condensation accumulating in the trap will lift the float I, and the latter will in turn lift the shackle K to cause a tilt of the cage L in a direction opposite that shown in the drawing. In the meantime the lower portion of the shackle will have come into contact with collar J on stem G and the automatic shift of ball N will exert a jerk on said stem to insure lift of valve F from its seat. As the trap discharges the float I descends to come against collar H on the valve-stem, and, owing to steam pressure in the trap above said float, the valve will reseat, the shackle, cage, and ball being also automatically returned to their normal position herein shown.

The normal elevation of float I is dependent on adjustment of collar H on valve-stem G, and the normal tilt of ball-cage L depends upon the adjustment of collar J on said stem;

consequently the trap may be organized to drain at longer or shorter intervals.

Having thus explained my invention, what I claim as new, and desire to secure by Letters Patent, is—

1. A steam-trap comprising a suitable hollow structure having an inlet in its upper portion and its bottom provided with an outlet, a valve arranged to govern said outlet, a stem extended upward from the valve, a float loose on the valve-stem, a suitably-supported tilt-cage connected to said stem, and a weight loose in the cage.

2. A steam-trap comprising a suitable hollow structure having an inlet in its upper portion and its bottom provided with an outlet, a deflector suspended in the structure adjacent to said inlet, a valve arranged to govern said outlet, a stem extended upward from the valve, a float loose on the valve-stem, a suitably-supported tilt-cage connected to said stem, and a weight loose in the cage.

3. A steam-trap comprising a suitable hollow structure having an inlet in its upper portion and an outlet in its bottom, a valve arranged to govern said outlet, a stem in pivotal connection with the valve, a float loose on the valve-stem, a suitably-supported tilt-cage connected to the stem, and a weight loose in the cage.

4. A steam-trap comprising a suitable hollow structure having an inlet in its upper portion and its bottom provided with an outlet, a valve arranged to govern said outlet, a stem extended upward from the valve, a float loose on the stem, a collar on the aforesaid stem, a shackle inclosing the collar and provided with a socket-shank engaging the valve-stem, a suitably-supported tilt-cage in pivotal connection with the shackle-shank, and a weight loose in the cage.

5. A steam-trap comprising a suitable hollow structure having an inlet in its upper portion and its bottom provided with an outlet, a valve arranged to govern said outlet, a stem extending upward from the valve, upper and lower collars adjustable on the valve-stem, a float loose on said stem above the lower collar, a shackle inclosing the upper collar and provided with a socket-shank engaging the valve-stem, a suitably-supported tilt-cage in pivotal connection with the shackle-shank, and a weight loose in the cage.

6. A steam-trap comprising a suitable hollow structure provided with an inlet in its upper portion, an outlet in its bottom and an interior bracket; a valve arranged to govern said outlet, a stem extended upward from the valve, a float loose on the stem, a stem-controlling cage in pivotal connection with the aforesaid bracket, and a weight loose in the cage.

In testimony that I claim the foregoing I have hereunto set my hand, at Milwaukee, in the county of Milwaukee and State of Wisconsin, in the presence of two witnesses.

CHAS. H. HARTTERT.

Witnesses:
N. E. OLIPHANT,
B. C. ROLOFF.